(12) United States Patent
Moerters et al.

(10) Patent No.: US 7,722,849 B2
(45) Date of Patent: May 25, 2010

(54) PYROGENIC SILICON DIOXIDE AND A DISPERSION THEREOF

(75) Inventors: Martin Moerters, Rheinfelden (DE); Helmut Mangold, Rodenbach (DE); Monika Oswald, Hanau (DE); Kai Schumacher, Hofheim (DE); Heinz Lach, Rodenbach (DE); Gerrit Schneider, Hanau (DE)

(73) Assignee: Evonik Degussa GmbH, Essen (DE)

( * ) Notice: Subject to any disclaimer, the term of this patent is extended or adjusted under 35 U.S.C. 154(b) by 1329 days.

(21) Appl. No.: 10/530,491

(22) PCT Filed: Dec. 16, 2003

(86) PCT No.: PCT/EP03/14322

§ 371 (c)(1),
(2), (4) Date: Apr. 13, 2007

(87) PCT Pub. No.: WO2004/054929

PCT Pub. Date: Jul. 1, 2004

(65) Prior Publication Data

US 2008/0045411 A1    Feb. 21, 2008

(30) Foreign Application Priority Data

Dec. 17, 2002  (DE) ................... 102 58 857

(51) Int. Cl.
*C01B 33/12*  (2006.01)
*C01B 33/14*  (2006.01)
*C01B 33/141* (2006.01)
*C01B 33/142* (2006.01)
*C01B 33/143* (2006.01)
*C01B 33/18*  (2006.01)
*C01B 33/187* (2006.01)

(52) U.S. Cl. .................. 423/335; 423/336; 423/337

(58) Field of Classification Search .............. 423/335, 423/336, 337
See application file for complete search history.

(56) References Cited

U.S. PATENT DOCUMENTS 4,108,964 A    8/1978    Kratel et al.

(Continued)

FOREIGN PATENT DOCUMENTS

DE         26 20 737 A1    12/1977

(Continued)

OTHER PUBLICATIONS

U.S. Appl. No. 11/084,022, filed Mar. 21, 2005, Schumacher et al.

(Continued)

*Primary Examiner*—Timothy C Vanoy
*Assistant Examiner*—Serena L Hanor
(74) *Attorney, Agent, or Firm*—Oblon, Spivak, McClelland, Maier & Neustadt, L.L.P.

(57) ABSTRACT

Pyrogenic silicon dioxide powder with a BET surface area of 30 to 90 $m^2/g$, a DBP index of 80 or less, a mean aggregate area of less than 25000 $nm^2$ and a mean aggregate circumference of less than 1000 nm, wherein at least 70% of the aggregates have a circumference of less than 1300 nm. It is prepared by mixing at least one silicon compound in vapor form, a free-oxygen-containing gas and a combustible gas in a burner of known construction, igniting this gas mixture at the mouth of the burner and burning it in the flame tube of the burner, separating the solid obtained from the gas mixture and optionally purifying, wherein the oxygen content of the free-oxygen-containing gas is adjusted so that the lambda value is greater than or equal to 1, the gamma value is between 1.2 and 1.8, the throughput is between 0.1 and 0.3 kg $SiO_2/m^3$ of core gas mixture and the mean normalized rate of flow of gas in the flame tube at the level of the mouth of the burner is at least 5 m/s. The powder can be used as a filler. A dispersion containing the powder according to the invention. The powder can be used as a filler in rubber, silicone rubber and plastics. The dispersion can be used to prepare glass items.

41 Claims, 2 Drawing Sheets

Figure 1A:
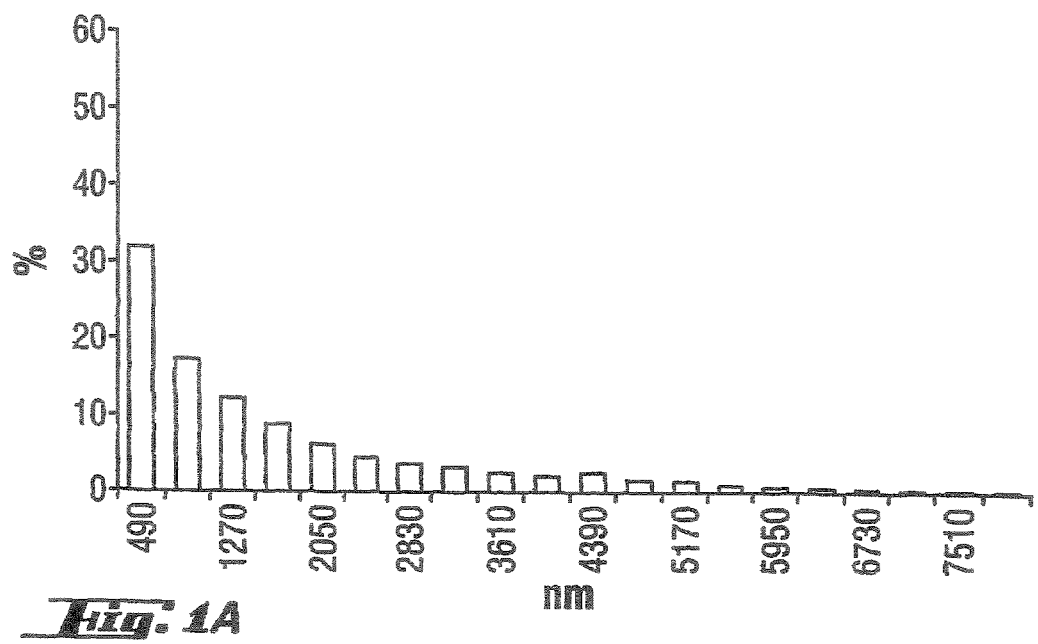

U.S. PATENT DOCUMENTS 6,063,354 A * 5/2000 Mangold et al. ............. 423/336
2001/0042493 A1* 11/2001 Scharfe et al. .............. 106/482
2004/0253164 A1 12/2004 Mangold et al.

FOREIGN PATENT DOCUMENTS

| EP | 0 759 410 | 2/1997 |
| EP | 1097964 A1 * | 5/2001 |
| EP | 1 182 168 | 2/2002 |

OTHER PUBLICATIONS

U.S. Appl. No. 11/084,170, filed Mar. 21, 2005, Schumacher et al.
U.S. Appl. No. 11/085,151, filed Mar. 22, 2005, Schumacher et al.
U.S. Appl. No. 10/530,284, filed Apr. 5, 2005, Moerters et al.
U.S. Appl. No. 10/549,929, filed Sep. 20, 2005, Schumacher et al.
U.S. Appl. No. 11/055,605, filed Feb. 11, 2005, Schumacher et al.
U.S. Appl. No. 10/524,037, filed Feb. 9, 2005, Schumacher et al.

* cited by examiner

1 μm

1 μm

PYROGENIC SILICON DIOXIDE AND A DISPERSION THEREOF

The invention provides a pyrogenically prepared silicon dioxide powder, an aqueous dispersion containing this silicon dioxide powder and the preparation and use of the silicon dioxide powder and the dispersion.

The expression pyrogenic silicon dioxide or pyrogenic silica (English: fumed silica, pyrogenic silica) includes all highly disperse silicas which are obtained by coagulation of monomeric silica in the gas phase at high temperature There are two processes for the industrial preparation of pyrogenic silicas; high temperature hydrolysis and the arc process.

In the high temperature hydrolysis process, a homogeneous mixture of a silicon compound in the form of a vapour, usually silicon tetrachloride, hydrogen, oxygen and an inert gas is burnt using a burner in a cooled combustion chamber. The following reactions then take place one after the other:

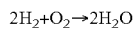

$2H_2 + O_2 \rightarrow 2H_2O$     1.

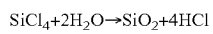

$SiCl_4 + 2H_2O \rightarrow SiO_2 + 4HCl$     2.

Due to the homogeneity of the gas mixture the reaction conditions and thus the conditions for production and growth, are largely identical for each $SiO_2$ particle so very uniform and homogeneous particles can be formed. In the well-known process, air is used as the source of oxygen. Pyrogenic silicas prepared by the well-known process have specific surface areas between 10 and 600 $m^2/g$.

EP-A-759410 describes the preparation of a pyrogenic silicon dioxide powder with a surface area of less than 90 $m^2/g$ preferably less than 60 $m^2/g$, and a dibutyl phthalate index (DBP index), expressed as grams of dibutyl phthalate per 100 grams of silicon dioxide powder, of less than 60. The DBP index is understood to be a measure of the structure or the degree of intergrowth of the particles in the powder. A low structure is expressed by a low DBP index. The silicon dioxide powder described in SP-A-759410 therefore has a relatively low structure along with a relatively low surface area. An essential feature of the process for preparing the powder is preheating the mixture of silicon compound and air to temperatures of about 400° C.

The combination of low surface area and low structure is also specified in EP-A-1182168. Dispersions of the silicon dioxide powder prepared in that document have a low viscosity. However, it is a disadvantage that stable dispersions cannot be obtained with a degree of filling of more than 30 wt. %. Highly filled dispersions can be used to advantage, for example, in the colloidal sol-gel process for preparing glass items due to the low shrinkage which occurs during drying and sintering.

The prior art describes silicon dioxide powder with a low surface area and a low structure.

The object of the invention is to provide a silicon dioxide powder which has a low BET surface area, comparable to that in the prior art, but an even more reduced structures The object is also to provide a process for preparing the silicon dioxide powder. Furthermore the object of the invention is to provide a dispersion with a high degree of filling.

The object is achieved by a pyrogenic silicon dioxide powder with
  a BET surface area of 30 to 90 $m^2/g$.
  a DBP index of 80 or less
  a mean aggregate area of less than 25000 $nm^2$,
  a mean aggregate circumference of less than 1000 nm,
  wherein at least 70% of the aggregates have a circumference of less tan 1300 nm.

The BET surface area may preferably be between 35 and 75 $m^2/g$. Particularly preferably the values may be between 40 and 60 $m^2/g$. The BET surface area is determined in accordance with DIN 66131.

The DBP index may preferably be between 60 and 80. During DBP absorption the take-up of force, or the torque (in Nm), of the rotating blades in the DBP measuring equipment is measured while defined amounts of DBP are added comparable to a titration. A sharply defined maximum followed by a drop, at a specific added amount of DBP is then produced for the powder according to the invention.

A silicon dioxide powder with a BET surface area of 40 to 60 $m^2/g$ and a DBP index of 60 to 80 may be particularly preferred.

Furthermore, the silicon dioxide powder according to the invention may preferably have a mean aggregate area of at most 20000 $nm^2$. Particularly preferably, the mean aggregate area may be between 15000 and 20000 $nm^2$. The aggregate area can be determined, for example, by image analysis of TEM images. An aggregate in the context of the invention is understood to consist of primary particles of similar structure and size which have intergrown with each other, the surface area of which is less than the sum of the individual isolated primary particles. Primary particles, in the context of the invention, are understood to be the particles which are initially formed in the reaction and which can grow together to form aggregates as the reaction proceeds further.

A silicon dioxide powder with a BET surface area of 40 to 60 $m^2/g$, e DBP index of 60 to 80 and a mean aggregate area between 15000 and 20000 $nm^2$. may be particularly preferred.

In a preferred embodiment, the silicon dioxide powder according to the invention may have a mean aggregate circumference of less than 1000 nm. Particularly preferably, the mean aggregate circumference may be between 600 and 1000 nm. The aggregate circumference can also be determined by image analysis of TEM images.

A silicon dioxide powder with a BET surface area of 40 to 60 $/^2/g$, a DBP index of 60 to 80, a mean aggregate area between 15000 and 20000 $nm^2$ and a mean aggregate circumference between 600 and 1000 nm may be particularly preferred.

Furthermore, it may be preferable for at least 80%, particularly preferably at least 90%, of the aggregates to have a circumference of less than 1300 nm.

In a preferred embodiment, the silicon dioxide powder according to the invention may assume a degree of filling in an aqueous dispersion of up to 90 wt. %. The range between 60 and 80 wt % may be particularly preferred.

Determination of the maximum degree of filling in an aqueous dispersion is performed by the incorporation of powder, in portions, into water using a dissolver, without the addition of other additives. The maximum degree of filling is achieved when either no further powder is taken up into the dispersion, despite elevated stirring power, i.e. the powder remains in dry form on the surface of the dispersion, or the dispersion becomes solid or the dispersion starts to form lumps.

Furthermore, the silicon dioxide powder according to the invention may have a viscosity at a temperature of 23° C., with respect to a 30 wt % aqueous dispersion at a rate of shear of 5 rpm, of less than 100 mPas. In particularly preferred embodiments, the viscosity may be less than 50 mPas.

The pH of the silicon dioxide powder according to the invention may be between 3.8 and 5, measured in a 4% aqueous dispersion, The invention also provides a process for preparing silicon dioxide powder according to the invention, which is characterised in that at least one silicon compound in the vapour form, a free-oxygen-containing gas and a combustible gas are mixed in a burner of known construction, this gas mixture is ignited at the mouth of the burner and is burnt in the flame tube of the burner, the solid obtained is separated from the gas mixture and optionally purified, wherein the oxygen content of the free-oxygen-containing gas is adjusted so that the lambda value is greater than or egual to 1, the gamma-value is between 1.2 and 1.8, the throughput is between 0.1 and 0.3 kg $SiO_2/m^3$ of core gas mixture, the mean normalised rate of flow of gas in the flame tube at the level of the mouth of the burner is at least 5 m/s.

The oxygen content of the free-oxygen-containing gas may correspond to that of air. That is, in this case air is used as a free-oxygen-containing gas. The oxygen content may, however also take on higher values. In a preferred manner, air enriched with oxygen should have an oxygen content of not more than 40 vol. %.

Lambda describes the ratio of oxygen supplied in the core to the stoichiometrically required amount of oxygen. In a preferred embodiment, lambda lies within the range $1<lambda\leq1.2$.

Gamma describes the ratio of hydrogen supplied in the core to the stoichiometrically required amount of hydrogen. In a preferred embodiment, gamma lies within the range $1.6<gamma\leq1.8$.

The normalised rate of flow of gas refers to the rate of flow at 273 K and 1 atm.

A burner of known construction is understood to be a burner with concentric tubes. The core gases are passed through the inner tube, the core. At the end of the tube the mouth of the burner, the gases are ignited. The inner tube is surrounded by at least one other tube, the sleeve. The reaction chamber, called the flame tube, starts at the level of the mouth of the burner. This is generally a conical tube, cooled with water, which may optionally be supplied with other gases (sleeve gases) such as hydrogen or air.

The mean, normalised rate of flow of the gas in the flame tube at the level of the mouth of the burner of at least 5 m/s refers to the rate of flow immediately after the reaction mixture leaves the burner. The rate of flow is determined by means of the volume flow of the reaction products in vapour form and the geometry of the flame tube.

The core gases are understood to be the gases and vapours supplied to the burner, that is the free-oxygen-containing gas, generally air or air enriched with oxygen, the combustible gas, generally hydrogen, methane or natural gas, and the silicon compound or compounds in vapour form.

An essential feature of the process according to the invention is that the mean normalised rate of flow of gas in the flame tube at the level of the mouth of the burner is at least 5 m/s. In a preferred embodiment, the mean normalised rate of flow of the gas in the flame tube at the level of the mouth of the burner assumes values of more than 8 m/s.

The mean rate of discharge of the gas mixture (feedstocks) at the mouth of the burner is not limited. However, it has proven to be advantageous when the rate of discharge at the mouth of the burner is at least 30 m/s.

In a preferred embodiment, additional air (secondary air) may be introduced into the reaction chamber, wherein the rate of flow in the reaction chamber may be raised further.

In a preferred embodiment, the mean normalised rate of flow of gas in the flame tube at the level of the mouth of the burner may be 8 to 12 m/s.

The type of silicon compound used in the process according to the invention is not further restricted. Silicon tetrachloride and/or at least one organochlorosilicon compound may preferably be used.

A particularly preferred embodiment of the process according to the invention is one in which silicon tetrachloride is used, the lambda value is such that $1<lambda\leq1.2$, the gamma-value is between 1.6 and 1.8, the throughput is between 0.1 and 0.3 kg $SiO_2/m^3$ of core gas mixture, in addition at least double the amount of air, with respect to the amount of free-oxygen-containing gas introduced into the burner, is introduced into the flame tube and the rate of flow of the gas of feedstocks at the mouth of the burner is 40 to 65 m/s (with respect to standard conditions)

and the mean normalized rate of flow of gas in the flame tube at the level of the mouth of the burner is between 8 and 12 m/s.

In general during the preparation of pyrogenic oxides, the rate of flow of gas in the water-cooled reaction chamber (flame tube) and in the subsequent cooling unit (cooling stretch) is adjusted in such a way that the best possible cooling power, that is to say rapid cooling of the reaction products, is ensured. In principle, it is true that the cooling power increases with decreasing rate of flow of gas. The lower limit is simply based on the requirement of still being able to transport the product through the pipes with the gas stream.

Surprisingly, it was demonstrated in the process according to the invention that although a considerable increase in the rate of flow of gas in the reaction chamber resulted in a reduced cooling power, it led to a powder with unexpected properties. Whereas physical characteristics such as BET surface area and DBP absorption are substantially unchanged as compared with powders according to the prior art, the powder according to the invention exhibits a much lower structure.

The invention also provides an aqueous dispersion which contains the silicon dioxide powder according to the invention.

The aqueous dispersion according to the invention may have a concentration of silicon dioxide powder between 20 and 80 wt. %. Dispersions with a concentration of silicon dioxide powder between 40 and 60 wt % may be particularly preferred. These dispersions have a high stability and a relatively low structure. A dispersion with about 50 wt. % may be very particularly preferred.

In a preferred embodiment, an aqueous dispersion according to the invention with 50 wt. % of silicon dioxide powder has a viscosity which is less than 2500 mPas at a rate of shear of 50 rpm. The range less than 2000 mPas may be particularly preferred.

The aqueous dispersion according to the invention may preferably have a mean particle size for aggregates of the silicon dioxide powder which is less than 200 nm. For certain applications, a value of less than 150 nm may be particularly preferred.

The dispersion according to the invention can be stabilised by the addition of bases or cationic polymers or aluminium salts or a mixture of cationic polymers and aluminium salts or acids.

Ammonia, ammonium hydroxide, tetramethylammonium hydroxide, primary, secondary or tertiary organic amines, caustic soda solution or caustic potash solution may be used as bases.

Cationic polymers which may be used are those with at least one quaternary ammonium group or phosphonium group, an acid adduct of a primary secondary or tertiary amine group, polyethylenimines, polydiallylamines or polyallylamines, polyvinylamines, dicyanodiamide condensates, dicyanodiamide-polyamine cocondensates or polyamide-formaldehyde condensates.

Aluminium salts which may be used are aluminium chloride, aluminium hydroxychlorides of the general formula $Al(OH)_xCl$ where x=2-8, aluminium chlorate, aluminium sulfate, aluminium nitrate, aluminium hydroxynitrates of the general formula $Al(OH)_xNO_3$ where x=2-8, aluminium acetate alums such as aluminium potassium sulfate or aluminium ammonium sulfate, aluminium formates, aluminium lactate, aluminium oxide, aluminium hydroxide acetate, aluminium isopropylate, aluminium hydroxide, aluminium silicates and mixtures of the previously mentioned compounds.

Acids which may be used are inorganic acids, organic acids or mixtures of the previously mentioned.

Inorganic acids which may be used are in particular phosphoric acid, phosphorous acid, nitric acid, sulfuric acid, mixtures thereof and their acidic salts.

Preferred organic acids are carboxylic acids of the general for $C_nH_{2n+1}CO_2H$, where n=0-6 or n=8, 10, 12, 14, 16, or dicarboxylic acids of the general formula $HO_2C(CH_2)_nCO_2H$, where n=0-4 or hydroxycarboxylic acids of the general formula $R_1R_2C(OH)CO_2H$, where $R_1$=H, $R_2$=$CH_3$, $CH_2CO_2H$, $CH(OH)CO_2H$, or phthalic acid or salicylic acid, or acidic salts of the previously mentioned acids or mixtures of the previously mentioned acids and their salts.

The dispersion according to the invention may be particularly advantageously stabilised by tetramethylammonium hydroxide or aluminium hydroxychloride in acid medium.

The dispersion may optionally also contain further additives. These may be, for example, oxidising agents such as hydrogen peroxide or peracids, oxidation activators, the purpose of which is to increase the rate of oxidation, corrosion inhibitors such as, for example, benzotriazole Furthermore, surface-active substances which are of the non-ionic, cationic, anionic or amphoteric type may be added to the dispersion according to the invention.

The invention also provides a process for preparing the dispersion according to the invention which is characterised in that the silicon dioxide powder according to the invention is incorporated, using a dispersion device, into water which can be stabilised by adding bases or cationic polymers or aluminium salts or a mixture of cationic polymers and aluminium salts or acids and then further dispersed for a period of 5 to 30 minutes.

There is no restriction on the type of dispersion device. However, it may be advantageous to make use of dispersion devices with a high energy input, designed specifically for the preparation of highly filled dispersions. These may be, for example, rotor-stator systems, planetary compounders or high energy mills. In the last-mentioned, two predispersed streams of suspension under high pressure are depressurised via a nozzle. The two dispersion jets impact precisely on each other and the particles mill each other. In another embodiment, the predispersion is also placed under high pressure, but collision of the particles takes place against hardened wall regions. A rotor-stator system may preferably be used to prepare the dispersion according to the invention.

The invention also provides use of the silicon dioxide powder according to the invention as a filler in rubber, silicone rubber and plastics to adjust the rheology in dyes and lacquers and as a support for catalysts.

The invention also provides use of the dispersion. According to the invention to prepare glass items, for chemical-mechanical polishing and to prepare ink-jet papers.

EXAMPLES

The BET surface area is determined in accordance with DIN 66131.

The dibutyl phthalate absorption is measured with a RHEOCORD 90 instrument made by Haake, Karlsruhe For this purpose, 16 g of the silicon dioxide powder, weighed out to an accuracy of 0.001 g, is placed in a mixing chamber this is sealed with a lid and dibutyl phthalate is added at a pre-set rate of addition of 0.0667 ml/s via a hole in the lid. The mixer is operated with a motor speed of 125 revs per minute. After reaching maximum torque, the mixer and DBP addition are automatically switched off. The DBP absorption is calculated from the amount of DBP consumed and the amount of particles weighed out in accordance with:

DBP index (g/100 g)=(DBP consumed in g/initial weight of particles in g)×100.

A programmable rheometer for testing complex flow behaviour, equipped with a standard rotation spindle, was available for determining the viscosity.

Rate of shear: 5 to 100 rpm

Temperature of measurement: room temperature (23° C.)

Concentration of dispersion: 30 wt. %

Procedure: 500 ml of dispersion are placed in a 600 ml glass beaker and tested at room temperature (statistical recording of temperature via a measuring sensor) under different rates of shear.

Determination of the compacted bulk density is based on DIN ISO 787/XI K 5101/18 (not sieved).

Determination of the pH is based on DIN ISO 787/IX, ASTM D 1280, JIS K 5101/24.

The image analyses were performed using a TEM instrument H 7500 made by Hitachi and a CCD camera MegaView II, made by SIS. Image magnification for evaluation purposes was 30000:1 at a pixel density of 3.2 nm. The number of particles evaluated was greater than 1000. Preparation was in accordance with ASTP 3849-89. The lower threshold limit for detection was 50 pixels.

Determining the maximum degree of filling in an aqueous dispersion: 200 g of fully deionised water were initially placed in a 1 l vessel (diameter about 11 cm). A dissolver from VMA-Getzmann, model Dispermat® CA-40-C with a dissolver disc, diameter about 65 mm, was used as the dispersing unit.

At the start, the dissolver is operated at about 650 rpm. The powder is added in portions of about 5 g. After each addition, there is a waiting period until the powder has been completely incorporated into the suspension. Then the next portion is added. As soon as incorporation of an added amount of powder takes longer than about 10 s, the speed of the dissolver disc is increased to 1100 rpm. Then further stepwise addition is performed. As soon as incorporation of an added amount of powder takes longer than about 10 s the speed of the dissolver disc is increased to 1700 rpm.

The maximum degree of filling is achieved when either no further powder is taken up by the dispersion, despite increased stirring power, i.e. the powder remains in dry form on the surface of the dispersion, or the dispersion becomes solid or the dispersion starts to for lumps.

The amount of powder added an be determined by difference Weighing (preferably difference weighing of the powder stock). The maximum degree of filling is calculated as:

Maximum degree of filling=amount of powder added [g]/amount of powder added [g]+amount of water initially introduced [g]×100%

Example 1 (Comparison Example)

500 kg/h $SiCl_4$ are vaporised at about 90° C. and transferred to the central tube of a burner of known construction. 145 $Nm^3$/h of hydrogen and 207 $Nm^3$/h of air with an oxygen content of 35 vol. % are also introduced into this tube. This gas mixture is ignited and burnt in the flame tube of the water-cooled burner. The mean normalised rate of flow of gas in the flame tube at the level of the mouth of the burner is 0.7 m/s. After cooling the reaction gases, the pyrogenic silicon dioxide powder is separated from the hydrochloric acid-containing gases using a filter and/or a cyclone. The pyrogenic silicon dioxide powder is treated with water vapour and air in a deacidification unit.

Examples 2 to 4 (comparison examples) are performed in the same way as example 1. The parameters which are altered each time are given in Table 1.

Example 5 (Working Example)

400 kg/h $SiCl_4$ are vaporised at about 90° C. and transferred to the central tube of a burner of known construction. 195 $Nm^3$/h of hydrogen and 303 $Nm^3$/h of air with an oxygen content of 30 vol. % are also introduced into this tube. This gas mixture is ignited and burnt in the flame to be of the water-cooled burner. The mean normalised rate of flow of gas in the flame tube at the level of the mouth of the burner is 10 m/s. After cooling the reaction gases, the pyrogenic silicon dioxide powder is separated from the hydrochloric acid-containing gases using a filter and/or a cyclone. The pyrogenic silicon dioxide powder is treated with water vapour and air deacidification unit.

Examples 6 to 8(in accordance with the invention) are performed in the same way as described in example 1. The parameters which are altered each time are given in Table 1.

The analytical data for powders 1 to 8 are given in Table 2.

The powders according to the invention in examples 5 to 8 exhibit much lower values for mean aggregate area, mean aggregate circumference and maximum and minimum aggregate diameter and thus much less structure than the powders in comparison examples 1 to 4.

The powders according to the invention also have a much higher maximum degree of filling and a much lower viscosity in an agueous dispersion.

TABLE 1

Experimental conditions and the flame parameters calculated therefrom

| | | Example | | | | | | | |
|---|---|---|---|---|---|---|---|---|---|
| | | Comparison examples | | | | Examples acc. to the invention | | | |
| | | 1 | 2 | 3 | 4 | 5 | 6 | 7 | 8 |
| $SiCl_4$ | kg/h | 500 | 500 | 400 | 400 | 400 | 400 | 350 | 400 |
| $H_2$ core | $Nm^3$/h | 145 | 210 | 255 | 190 | 195 | 195 | 145 | 195 |
| Air (primary air) | $Nm^3$/h | 207 | 300 | 250 | 320 | 303 | 300 | 220 | 300 |
| $O_2$ content of air | Vol. % | 35 | 35 | 35 | 30 | 35 | 29.5 | 35 | 33 |
| Secondary air[b] | $Nm^3$/h | — | 50 | 250 | 50 | 730 | 600 | 500 | 100 |
| Burner diameter | mm | 55 | 65 | 65 | 65 | 64 | 64 | 64 | 64 |
| Flame tube diameter | mm | 450 | 450 | 450 | 450 | 208 | 208 | 160 | 160 |
| lambda[c] | | 1.0 | 1.0 | 0.69 | 1.0 | 1.1 | 1.0 | 1.1 | 1.0 |
| gamma | | 1.1 | 1.6 | 2.4 | 1.8 | 1.8 | 1.8 | 1.6 | 1.8 |
| $V_B$[d] | m/s | 49 | 48 | 47 | 47 | 47 | 47 | 36 | 47 |
| $V_F$[e] | m/s | 0.7 | 1 | 1.28 | 1 | 10 | 9 | 12 | 8 |
| Throughput[a] | kg/$m^3$ | 0.42 | 0.31 | 0.25 | 0.25 | 0.26 | 0.26 | 0.3 | 0.26 |

[a] kg $SiO_2$/$m^3$ of primary air + hydrogen + $SiCl_4$ (feedstocks);

[b] air with 21 vol. % $O_2$;

[c] with reference to primary air;

[d] $V_B$ = mean rate of discharge at the mouth of the burner (normalised);

[e] $V_F$ = mean rate of flow in the reaction chamber at the level of the mouth of the burner (normalised).

TABLE 2

Analytical data for a silicon dioxide powders

| | | Comparison examples | | | | Examples acc. to the invention | | | |
|---|---|---|---|---|---|---|---|---|---|
| | | 1 | 2 | 3 | 4 | 5 | 6 | 7 | 8 |
| BET | m²/g | 44 | 55 | 49 | 60 | 45 | 44 | 60 | 55 |
| DBP | g/100 g | 106 | 121 | 142 | 90 | 67 | 72 | 61 | 65 |
| Mean aggregate area | nm² | 23217 | 22039 | 24896 | 22317 | 17063 | 15972 | 16816 | 18112 |
| Mean aggregate circumference | nm | 1032 | 1132 | 1201 | 1156 | 742 | 658 | 704 | 699 |
| Aggregates <1300 nm | % | 61 | 64 | 52 | 64 | 80 | 84 | 89 | 82 |
| Max. aggregate diameter | nm | 292 | (b) | (b) | (b) | 191 | 183 | (b) | (b) |
| Min. aggregate diameter | nm | 207 | (b) | (b) | (b) | 123 | 117 | (b) | (b) |
| Compacted bulk density | g/l | 112 | 90 | 89 | 117 | 117 | 105 | 110 | 123 |
| Viscosity[a] | mPas | 420 | 600 | 1200 | 380 | 20 | 33 | 48 | 18 |
| Maximum degree of filling | wt. % | 34 | 25 | 26 | 33 | 72 | 81 | 79 | 81 |
| pH | | 4.5 | 4.8 | 4.7 | 4.6 | 4.7 | 4.8 | 4.5 | 4.8 |

[a] 30 wt. % dispersion at 5 rpm;
[b] not determined

Figure 1B:
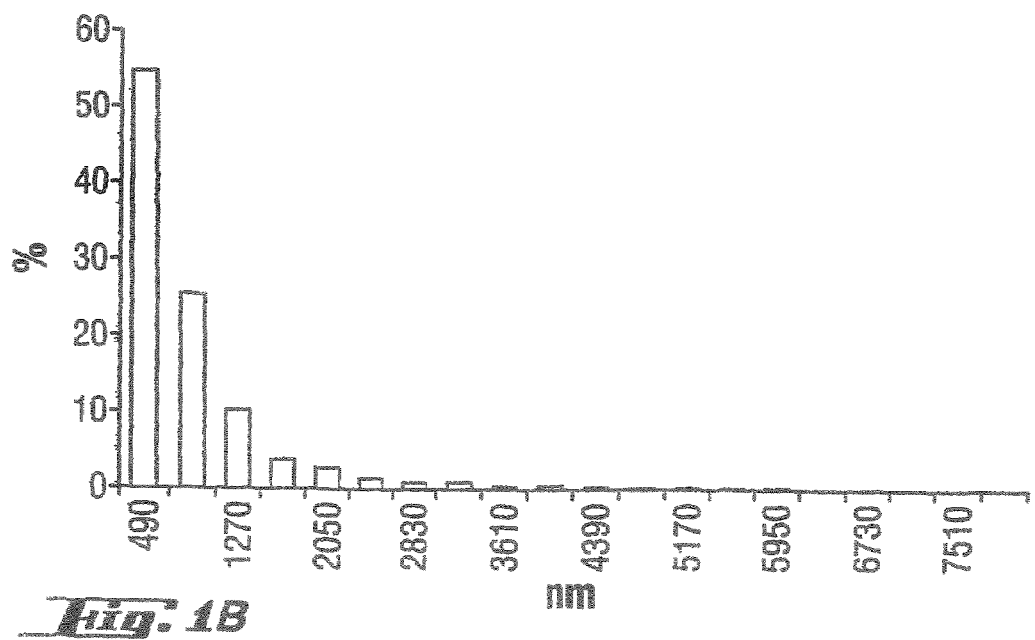

Table 3 shows the distribution of circumferences of the aggregates. FIGS. 1A and 1B which are associated with this data show the relative frequency (as a %-age) with which a certain range of aggregate diameters (in nm) occurs in the powders. The x axis is to be read as: up to 490 nm, 490 nm to 1270 nm, 1270 nm to 1660 nm etc.

FIG. 1A shows the distribution of aggregate circumferences for a powder not in accordance with the invention from example 3. FIG. 1B shows the distribution of circumferences for the powder according to the invention from example 5. the much narrower distribution for aggregates from the powder according to the invention should be noted.

Figure 2A:
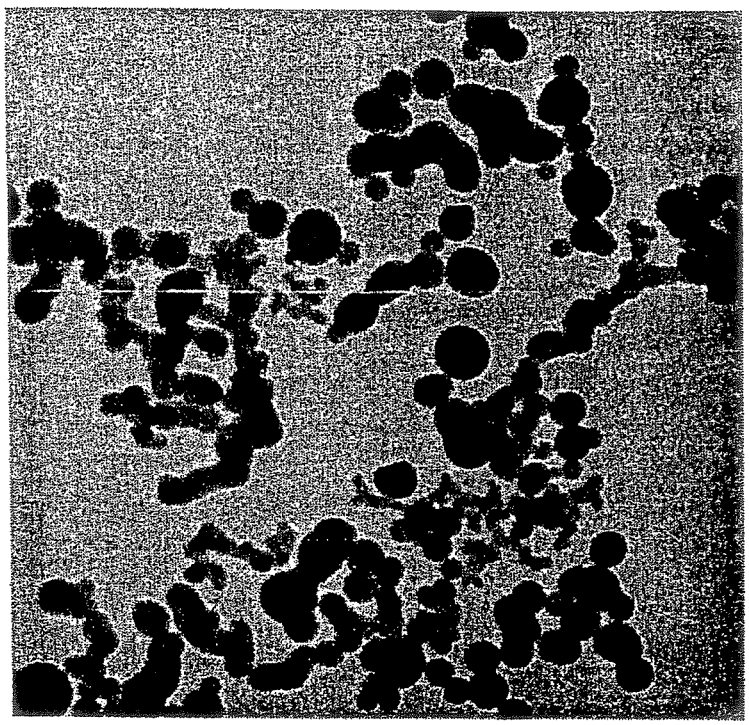
Figure 2B:
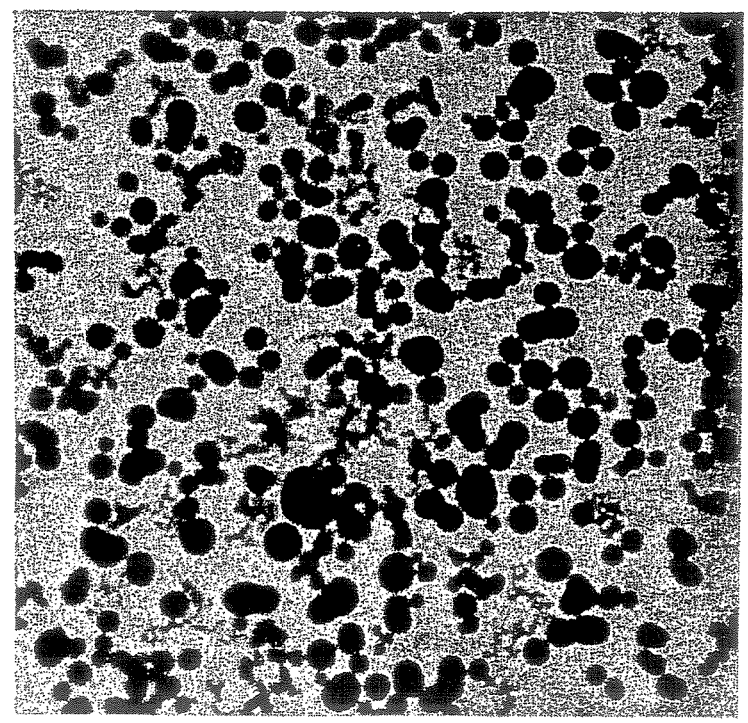

FIGS. 2A and 2B show TEM images with the same magnification. FIG. 2A shows the powder in comparison example 1, FIG. 2B shows the powder according to the invention in example 5. Here again the lower structure of the powder according to the invention can clearly be seen.

TABLE 3

Distribution of circumferences of aggregates from example 3 and example 5 according to image analysis

| Circumference of aggregate | | Example 3 Relative | Example 5 Relative |
|---|---|---|---|
| from nm | to nm | frequency % | frequency % |
| 100 | 490 | 32 | 55 |
| 490 | 880 | 17 | 25 |
| 880 | 1270 | 12 | 10 |
| 1270 | 1660 | 9 | 4 |
| 1660 | 2050 | 6 | 3 |
| 2050 | 2440 | 4 | 1 |
| 2440 | 2830 | 4 | 1 |
| 2830 | 3220 | 3 | 1 |
| 3220 | 3610 | 2 | 0 |
| 3610 | 4000 | 2 | 0 |
| 4000 | 4390 | 2 | 0 |
| 4390 | 4780 | 2 | 0 |
| 4780 | 5170 | 1 | 0 |
| 5170 | 5560 | 1 | 0 |
| 5560 | 5950 | 1 | 0 |
| 5950 | 6340 | 1 | 0 |
| 6340 | 6730 | 0 | 0 |
| 6730 | 7120 | 0 | 0 |

TABLE 3-continued

Distribution of circumferences of aggregates from example 3 and example 5 according to image analysis

| Circumference of aggregate | | Example 3 Relative | Example 5 Relative |
|---|---|---|---|
| from nm | to nm | frequency % | frequency % |
| 7120 | 7510 | 0 | 0 |
| 7510 | 7900 | 0 | 0 |

Example 9

Preparing a Dispersion According to the Invention

The silicon dioxide powder according to the invention from example 5 is introduced, in portions under dispersing conditions to 246.5 kg of fully deionised water adjusted to a pH of 11 with tetramethylammonium hydroxide. Dispersion is achieved using a rotor-stator machine of the Conti-TDS 5 type made by Ystral. The pH is maintained at a value between 10 and 11 by adding tetramethylammonium hydroxide. After complete incorporation of the powder dispersing is continued for a further period of 12 minutes.

The resulting dispersion has a silicon dioxide content of wt. % and a pH of 9.6. It has a viscosity of 1942 mPas, measured with a Brookfield viscometer. The mean aggregate size, determined using a particle size analyser Model LB-500 from Horiba, in the dispersion is 145 nm.

The dispersion exhibits no thickening or sedimentation, even after a storage time of 6 months. A dispersion prepared in the same way using the silicon dioxide powder from example 1 thickens within 2 weeks.

The invention claimed is:
1. A pyrogenic silicon dioxide powder with
   a BET surface area of 30 to 90 m²/g,
   a DBP index of 80 or less
   a mean aggregate area of less than 25000 nm²,
   a mean aggregate circumference of less than 1000 nm,
   wherein at least 70% of the aggregates have a circumference of less than 1300 nm.

2. The pyrogenic silicon dioxide powder according to claim 1, wherein the BET surface area is between 35 and 75 m$^2$/g.

3. The pyrogenic silicon dioxide powder according to claim 1, wherein the DBP index is between 60 and 80.

4. The pyrogenic silicon dioxide powder according to claim 1, wherein the BET surface area is between 40 and 60 m$^2$/g and the DBP index is 60 to 80.

5. The pyrogenic silicon dioxide powder according to claim 1, wherein the pyrogenic silicon dioxide powder has a mean aggregate area of at most 20000 nm$^2$.

6. The pyrogenic silicon dioxide powder according to claim 1, wherein the BET surface area is 40 to 60 m$^2$/g, the DBP index is 60 to 80 and the mean aggregate area is between 15000 and 20000 nm$^2$.

7. The pyrogenic silicon dioxide powder according to claim 1, wherein the pyrogenic silicon dioxide powder has a mean aggregate circumference of less than 1000 nm.

8. The pyrogenic silicon dioxide powder according to claim 1, wherein the BET surface area is 40 to 60 m$^2$/g, the DBP index is 60 to 80, the mean aggregate area is 1500 to 20000 nm$^2$ and the mean aggregate circumference is 600 to 1000 nm.

9. The pyrogenic silicon dioxide powder according to claim 1, wherein the degree of filling of the powder in an aqueous dispersion is up to 90 wt. %.

10. The pyrogenic silicon dioxide powder according to claim 1, wherein the pyrogenic silicon dioxide powder has a viscosity of less than 100 mPas, with respect to a 30 wt. % aqueous dispersion, at a rate of shear of 5 rpm.

11. The pyrogenic silicon dioxide powder according to claim 1, wherein the pyrogenic silicon dioxide powder has a pH, measured in a 4% strength aqueous dispersion, of between 3.8 and 5.

12. A process for preparing the pyrogenic silicon dioxide powder according to claim 1, wherein at least one silicon compound in vapour form, a free-oxygen-containing gas and a combustible gas are mixed in a burner of known construction, this gas mixture is ignited at the mouth of the burner and burnt in the flame tube of the burner, the solid obtained is separated from the gas mixture and optionally purified, wherein the oxygen content of the free-oxygen-containing gas is adjusted so that the lambda value is greater than or equal to 1, the gamma value is between 1.2 and 1.8, the throughput is between 0.1 and 0.3 kg SiO$_2$/m$^3$ of core gas mixture, the mean, normalised rate of flow of gas in the flame tube at the level of the mouth of the burner is at least 5 m/s.

13. The process according to claim 12, wherein the oxygen content of the free-oxygen-containing gas is not more than 40 vol. %.

14. The process according to claim 12, wherein, 1<lambda≦1.2.

15. The process according to claim 12, wherein 1.6<gamma≦1.8.

16. The process according to claim 12, wherein the mean normalised rate of flow of gas in the flame tube at the level of the mouth of the burner is more than 8 m/s.

17. The process according to claim 12, wherein the mean rate of discharge of the gas mixture at the mouth of the burner is at least 30 m/s.

18. The process according to claim 12, wherein additional air (secondary air) is introduced into the flame tube.

19. The process according to claim 12, wherein silicon tetrachloride and/or at least one organosilicon compound is used as a silicon compound.

20. The process according to claim 12, wherein
silicon tetrachloride is used,
1<lambda≦1.2,
1.6<gamma<1.8,
the throughput is between 0.1 and 0.3 kg SiO$_2$/m$^3$ of core gas mixture,
in addition at least double the amount of air, with respect to the amount of free-oxygen-containing gas introduced into the burner, is introduced into the flame tube and
the rate of flow of feedstocks at the mouth of the burner is 40 to 65 m/s
and the mean normalised rate of flow of gas in the flame tube at the level of the mouth of the burner is between 8 and 12 m/s.

21. An aqueous dispersion comprising the pyrogenic silicon dioxide powder as claimed in claim 1.

22. The aqueous dispersion according to claim 21, wherein the concentration of the pyrogenic silicon dioxide powder is between 20 and 80 wt. %.

23. The aqueous dispersion according to claim 21, wherein the viscosity of a 50 wt. % dispersion is less than 2500 mPas at a rate of shear of 50 rpm.

24. The aqueous dispersion according to claim 21, wherein the mean particle size of the silicon dioxide powder is less than 200 nm.

25. The aqueous dispersion according to claim 21, wherein the dispersion is stabilised by adding bases or cationic polymers or aluminum salts or a mixture of cationic polymers and aluminum salts or acids.

26. The aqueous dispersion according to claim 21, wherein the aqueous dispersion contains additives.

27. A process for preparing the aqueous dispersion in accordance with claim 21, wherein the pyrogenic silicon dioxide powder is incorporated, using a dispersion device, into water which can be stabilised by adding bases or cationic polymers or aluminum salts or a mixture of cationic polymers and aluminum salts or acids and is then further dispersed for a period of 5 to 30 minutes.

28. The process according to claim 27, wherein a rotor-stator system is used as a dispersing system.

29. The aqueous dispersion according to claim 21 wherein the concentration of the pyrogenic silicon dioxide powder is between 40 and 60 wt %.

30. A rubber article, a silicon rubber article or a plastic article comprising the pyrogenic silicon dioxide powder as claimed in claim 1.

31. A method for producing a rubber article, a silicon rubber article or a plastic article comprising adding the pyrogenic silicon dioxide powder as claimed in claim 1 to a rubber formulation, a silicon rubber formulation or a plastic formulation.

32. A method for adjusting the rheology of a dye or a lacquer comprising adding the pyrogenic silicon dioxide powder as claimed in claim 1 to a dye formulation or a lacquer formulation.

33. A dye or a lacquer comprising the pyrogenic silicon dioxide powder as claimed in claim 1.

34. A catalyst support comprising the pyrogenic silicon dioxide powder as claimed in claim 1.

35. A method for preparing a catalyst comprising supporting a catalytically active material onto the pyrogenic silicon dioxide powder as claimed in claim 1.

36. A glass article comprising the pyrogenic silicon dioxide powder as claimed in claim 1.

37. A method for preparing a glass article comprising adding the pyrogenic silicon dioxide powder as claimed in claim 1 to a glass formulation.

38. A chemical-mechanical polish comprising the pyrogenic silicon dioxide powder as claimed in claim 1.

39. A method for polishing comprising utilizing the chemical-mechanical polish as claimed in claim 38 as a polish.

40. A coating for ink-jet paper comprising the pyrogenic silicon dioxide powder as claimed in claim 1.

41. A method for preparing ink-jet paper comprising coating paper with the coating for ink-jet paper as claimed in claim 40.

* * * * *

UNITED STATES PATENT AND TRADEMARK OFFICE
CERTIFICATE OF CORRECTION

| | | |
|---|---|---|
| PATENT NO. | : 7,722,849 B2 | Page 1 of 1 |
| APPLICATION NO. | : 10/530491 | |
| DATED | : May 25, 2010 | |
| INVENTOR(S) | : Moerters et al. | |

It is certified that error appears in the above-identified patent and that said Letters Patent is hereby corrected as shown below:

On the title page, Item (86), the PCT information is incorrect. Item (86) should read:
-- (86) PCT No.:  PCT/EP03/14322

§ 371 (c) (1),
        (2), (4) Date: Apr. 6, 2005 --

Signed and Sealed this

Tenth Day of August, 2010

David J. Kappos
*Director of the United States Patent and Trademark Office*